Patented May 14, 1946

2,400,287

UNITED STATES PATENT OFFICE 2,400,287

PROCESS OF NITRATION

George V. Caesar, Staten Island, N. Y., assignor to Stein, Hall & Company, Inc., New York, N. Y., a corporation of New York No Drawing. Application September 23, 1943, Serial No. 503,529

16 Claims. (Cl. 260—220)

The present invention relates to a new process of direct liquid phase anhydrous nitration of organic compounds by the replacement of hydrogen therein by a nitro group and without molecular dearrangement of the compounds, and in which process water is neither present nor produced as a result of the nitration.

It is well known that many organic compounds are susceptible to nitration to form nitric esters and nitro compounds having great usefulness, for example, as explosives. Among the materials which may be nitrated are, for example, the carbohydrates and polysaccharides, i. e., starches, celluloses and sugars such as lactose and sucrose. Among the other utilizable compounds are alcohols, such as pentaerythritol, mannitol and glycerol, hydrocarbons, both aromatic and aliphatic, such as toluene and paraffins, amines, and others of lesser importance at the present time. The present invention is applicable to the treatment of all the materials referred to above as well as any others not specifically mentioned which are susceptible to nitration.

The introduction of nitro ($NO_2$) groups into organic compounds by direct liquid phase nitration has been accomplished in accordance with the prior art by treating the compounds with concentrated nitric acid ($HONO_2$), either alone or in admixture with strong water absorptive agents. In the nitration of organic compounds having a replaceable hydrogen atom or atoms, water is produced as a by-product of the nitration, when nitric acid is used as the nitrating agent. The general reaction may be symbolized as follows:

$$M.H. + HO.NO_2 \rightarrow M.NO_2 + H_2O \qquad (1)$$

where M represents the residue of the organic molecule and H is its hydrogen atom or atoms replaceable by the $NO_2$ group.

The reaction in the case of an aliphatic hydroxylated compound, for example, is believed to proceed as follows:

$$M.OH + HO.NO_2 \rightarrow M.O.NO_2 + H_2O \qquad (2)$$

where M is the residue to which the OH group is attached. This reaction is essentially the same as (1) since it is the hydrogen of the organic molecule which is replaced by the nitro group. It is immaterial in so far as the general type-reaction is concerned whether the nitro group is connected to carbon or through oxygen in the organic molecule or through nitrogen, provided that molecular dearrangement does not occur. Water is, in so far as I know, the invariable primary by-product of organic nitrations by nitric acid where molecular dearrangement is not involved.

The production of water in accordance with the above prior art process as a by-product of nitrations with nitric acid where molecular dearrangement is not involved, involves progressive dilution of the nitric acid with water during nitration. The presence of water is undesirable because it dilutes the acid and reduces its nitrating action, and tends to denitrate the more highly nitrated product formed before the acid becomes diluted. In nitration to produce high explosives, such as highly nitrated nitric esters and nitro compounds, the water formed as a by-product from nitric acid nitration must be removed to the fullest possible extent if the maximum explosive power is to be obtained from the nitrated product.

The prior art has attempted to circumvent the presence of water to the extent possible by the admixture of the nitric acid with suitable water absorptive agents, such as sulfuric acid, phosphoric acid, phosphorus pentoxide or acetic anhydride. Sulfuric acid is most commonly employed and is most economical. These dehydrating agents in order to operate efficiently must be maintained at maximum strength. A nitric acid nitrating solution, however, cannot be refortified indefinitely by the addition of water absorptive agents because of the resulting undesirable increase in volume. Ultimately the diluted acids must be withdrawn. When practiced in a large scale operation the effective disposal of the large quantities of spent acids presents a very difficult problem.

As indicative of the difficulties involved in the production of nitrations with nitric acid, it has not proved commercially feasible to nitrate cellulose, using mixed nitric and sulfuric acids, to a nitrogen content in excess of 13.5%. However, cellulose trinitrate theoretically has a nitrogen content of 14.14%. This difficulty in achieving high nitrations is attributed to the difficulty of constantly maintaining the nitrating solution at sufficiently high nitric acid concentrations throughout the entire period of nitration. In addition it is difficult to obtain uniformity in the nitrations, particularly if a continuous process is attempted, since the strength of the mixed acids necessary changes because of the production of water during the nitration.

Not only is the ultimate nitrogen content of nitrocellulose a function of the strength of the acid used in nitration, but the degree of nitration is very sensitive to changes in concentration as the theoretical nitrogen content is approached. This is occasioned by the fact that a portion of initially highly nitrated cellulose which may be formed at the start of the process when the acids are undiluted, may to some extent be denitrated, as the acids become diluted during the process. This sensitivity of nitrocellulose to the strength of a nitric acid nitrating solution, which is so marked in the higher stages of nitration, has rendered it impractical to produce very high nitrogen content explosives and has also rendered it impractical to accomplish the nitration in a truly continuous process. The basic cause of all of the disadvantages and difficulties is attributed to the formation of water as a by-product of the nitration.

I am familiar with the fact that in rare instances laboratory experiments on a small scale have been conducted, in which nitrogen pentoxide ($N_2O_5$) has been used as a nitrating agent. The general reaction symbolizing nitration with nitrogen pentoxide is:

$$M.H + N_2O_5 \rightarrow M.NO_2 + HONO_2 \qquad (3)$$

As will be seen from the reaction, the replaceable hydrogen atom or atoms in the organic compound to be nitrated combines with part of the nitrogen pentoxide to form nitric acid instead of water.

The use of nitrogen pentoxide, however, in the nitration of an organic compound usually offers insufficient compensating advantages over nitration with nitric acid and sulfuric acid, owing to the fact that the nitric acid, which is the initial by-product as indicated in Equaton 3, subsequently reacts with the organic compound to form water as a secondary product. This secondary reaction is the same as indicated in Equation 1 or 2. The nitration with $N_2O_5$ by such prior laboratory proposals involved all of the above discussed disadvantages of nitrating with nitric acid.

Another disadvantage of the use of mixed acids in nitration, aside from the formation of water, is the production of undesirable products of sulfuric acid or other water absorptive acids with the substance to be nitrated. In the nitration of cellulose, for example, sulfuric esters of cellulose may be formed. These adversely affect the stability of the nitrocellulose unless removed by long boiling treatments. Cellulose prepared by such mixed acid treatment may require as much as 100 hours of stabilizing treatment before it is satisfactory for conversion into smokeless propellants.

Another disadvantage of the presence of water in the nitration may be the development of considerable degeneration in certain polysaccharides. Starch particularly, for example is extremely sensitive to hydrolytic scission and the resulting nitro product, in accordance with the prior art, is usually found to be considerably degenerated. It has been observed that degeneration of the main valence polymers impairs the viscous properties.

In accordance with my invention I have discovered that organic compounds may be nitrated with nitrogen pentoxide ($N_2O_5$) in such a way that water formation is inhibited or prevented in either a primary or secondary reaction. My process, therefore, is one which is substantially anhydrous throughout and there are no undesirable effects due to the presence of water or the water absorptive acids as has been explained heretofore. The fact that in my process, water is neither produced as a primary by-product, nor allowed to be produced as a secondary by-product, is, so far as I know, unique in all liquid phase nitrations of organic compounds in which molecular dearrangement does not occur.

In accordance with my process, nitrogen pentoxide ($N_2O_5$) is dissolved in a suitable non-aqueous inert solvent and this is contacted with the organic material to be nitrated. The nitric acid formed by reaction of the organic material with the nitrogen pentoxide is removed from the solution by means of phosphorus pentoxide ($P_2O_5$). By this means the primary by-product of the reaction, nitric acid, is absorbed by the phosphorus pentoxide and, at least in part, reconverted to nitrogen pentoxide in accordance with, it is thought, the following reaction:

$$2HO.NO_2 + P_2O_5 \rightarrow N_2O_5 + 2HPO_3 \qquad (4)$$

The solvent selected is one in which nitrogen pentoxide and nitric acid are soluble, but in which phosphoric acid and the phosphorus pentoxide are insoluble.

The over-all reaction may be viewed as follows:

$$2M.H + 2N_2O_5 \rightarrow 2M.NO_2 + 2HONO_2 + P_2O_5 \rightarrow N_2O_5 + 2HPO_3$$

In the case of hydroxylated compounds the reaction is presumably the same except that the replaced hydrogen is attached in the organic molecule through oxygen.

The foregoing formula is given merely by way of example and illustration to assist in the understanding of the invention. In view of the disclosure, it will be apparent to one skilled in the art that the nitration may proceed to a much higher degree than that set forth above, if desired. For example, in preparing a tri-nitro product from cellulose or starch, for example, in the manufacture of explosives, the reactions which take place may be:

$$2R(OH)_3 + 3N_2O_5 + 3P_2O_5 \rightarrow 2R(O.NO_2)_3 + 6HPO_3$$

By means of this process, in which nitrogen pentoxide is in solution in the non-aqueous inert solvent, and the phosphorus pentoxide and phosphoric acid are insoluble in the solvent, it is possible to provide a simple means of indefinitely maintaining the purity of the nitrating solution and the only variable will be the concentration of the nitrogen pentoxide in the solvent. Even this may be eliminated as a variable by fortifying it with a solution of $N_2O_5$. The nitrogen pentoxide and phosphorus pentoxide need not necessarily be chemically pure compounds to be utilized in my process. However, if the purity of the final product is important, particularly for example in the manufacture of explosives, it is preferred to utilize ingredients which are as chemically pure as possible, whereby undesirable components will not enter into the reaction.

It has occurred to me that an advantage accruing from the suppression of the nitric acid by-product is the fact that nitrogen pentoxide is the sole item in the reaction with which there need by any concern. Thus I have found that possibly owing to the behavior of nitrogen pentoxide as a gas, reacting on a solid surface such as cellulose or starch, the surface concentration of the nitrogen pentoxide may remain substantially constant while the total strength or concentration of the nitrogen pentoxide in the nitrating solution may vary within relatively wide limits without appreciable effect upon the degree of nitration obtainable within these limits. In any case the practical advantages are obvious and make possible a truly continuous process of nitrating suitable materials, such as cellulose, to produce products of any desired nitrogen content.

The process may be carried out conveniently by subjecting the organic material to be nitrated to contact with the nitrating solution. This may be carried out in a batch operation, following which or even simultaneously the nitrating solution is treated with the phosphorus pentoxide. However, my process is so well adapted to a continuous process, and continuous processes are so desirable, that this seems to be the preferable commercial form. In one such continuous process the nitrating solution may be continuously circulated, first in contact with the organic material to be nitrated and then in contact with phosphorus pentoxide. In this process the nitric acid, as fast as it is formed as the primary by-product in the nitration, is carried away from the organic material in the circulating liquid and the nitric acid removed by treatment with $P_2O_5$ before it is re-contacted with the organic material. Not only may the nitrating solution be continuously moved in the manner described, but the organic material to be nitrated may also be continuously nitrated. For example the organic material may be passed continuously through a treating chamber through which the nitrating solution is continuously flowing, preferably counter-current. A series of regenerating chambers may be provided so that one may be used while another is being charged with a fresh quantity of phosphorus pentoxide.

While it may be preferred to carry out the reaction in the foregoing manner, it is unnecessary to utilize more than one vessel if desired. Satisfactory results have been obtained merely by agitating a mixture of the material to be nitrated, the solution of the nitrogen pentoxide in a neutral solvent and the phosphorus pentoxide. When the material to be nitrated, for example, toluene, is soluble in the neutral solvent, the latter technique generally will be preferred.

In view of the above explanation of the process, many ways of carrying out the nitration may be suggested to one skilled in the art and all such variations in technique are intended to be included within the scope of the present invention.

In the light of the previous discussion regarding the prior art and to one familiar with the art of nitration, the above described advantages are readily manifest.

Another advantage of my process is the fact that inasmuch as it is carried out without the presence of sulfuric or other water absorptive acids, there is little if any formation of esters other than the nitro compounds. Because of this fact it is relatively easy to stabilize the nitrated product, and it may be stabilized in less than five hours as compared with the long time required in mixed acid nitration. It is indeed quite probable that when nitrocellulose is prepared by my process the stabilization time may be reduced to a matter of minutes if the nitrated product is washed sufficiently with the inert solvent to remove any of the nitrating solution that may remain on the organic material.

Another advantage of my process is attributed to the fact that inasmuch as water is not present during nitration, there is no opportunity for degradation in viscosity or body when the process is applied to form nitric esters of polysaccharides, such as cellulose, starch and related long chain polymers. In these compounds the glucosidic linkages are sensitive to hydrolytic depolymerization by the water present in the mixed acid nitration process. Inasmuch as no water is produced or present in the process in my invention the original state of polymerization of the polysaccharides remains substantially unaffected by nitration. For example, nitric esters of cellulose of exceptionally high viscosity may be produced at any desired degree of nitration and the viscosity may be varied either by control of the initial viscosity of the cellulose, since no depolymerization occurs during nitration, or by subsequent depolymerization treatment after nitration.

The neutral solvent, which is utilized in accordance with the invention, may be selected from many available nonaqueous solvents, such as those of coal tar, or petroleum origin. It is preferred to utilize a solvent which is not reactive with any of the other material present, i. e., the nitrogen pentoxide, phosphorus pentoxide, phosphoric acid, the material to be nitrated, and the nitrated product. As will be discussed more fully hereinafter, however, it is possible to utilize solvents even though they may dissolve the materials to be nitrated or the nitrated products, but when possible, it is preferred to carry out the nitration with a solvent which will not dissolve the nitrated product. As specific examples, it has been found that chloroform, carbon tetrachloride or propylene dichloride may be used advantageously. In general, it is advantageous to utilize a solvent having a boiling point or range which is sufficiently high so that it can readily be maintained in the liquid phase during the nitration but sufficiently low so that it can easily be recovered from the nitrated product. Chloroform ($CHCl_3$), for example, is found to be particularly advantageous in this connection because of its boiling point of about 61.26° C. The foregoing solvents are mentioned merely by way of illustration, and it is intended that the invention shall not be limited thereto. The solvents which may be utilized cover a broad class and are well known to those skilled in the art. In view of the present disclosure, one skilled in the art may readily select a solvent suitable for the purpose intended. The neutral solvent, in addition to being a carrier for the nitrogen pentoxide, also is advantageous because it is a solvent for fats. As a result, the solvent will tend to remove undesirable fats or oils from the material to be treated, thus producing a superior product or conversely, permitting the use of starting materials of lesser purity.

The proportion of the ingredients utilized may be varied over a wide range, depending upon the conditions of operation and the results which it is desired to obtain. The theoretical amounts of the reacting ingredients, of course, may be calculated from the formulae of the reactions.

In general, it has been found convenient to dissolve the nitrogen pentoxide in the proportion of about 8 to 24 grams and preferably in the range of about 5–50 grams of nitrogen pentoxide per 100 cc. of solution. The degree of nitration appears to be more dependent upon time than upon the concentration of the nitrogen pentoxide when the initial concentration is above about 8 g. $N_2O_5$ per 100 cc. of solution. As the nitration proceeds, additional nitrogen pentoxide may be added, if desired, to fortify and maintain the initial strength of the solution. The foregoing proportions have merely been given as illustrative and are not intended to be a limitation upon the scope of the invention.

The amount of the nitrogen pentoxide nitrating solution utilized, if desired, may be greatly in excess of the amount theoretically required for treating the materials to be nitrated in order to insure a sufficiently high reaction velocity and to cause the reaction to proceed to the desired degree. When the process is carried out continuously, an even greater amount of solution may be required to fill the system. Any larger amount may be used and it will be apparent in view of the present disclosure, that the amount is not critical and may be varied throughout a wide range without affecting the economy of the process.

The amount of phosphorus pentoxide which may be utilized also is not critically limited. In general, it is desired to utilize sufficient phosphorus pentoxide to insure adsorption or regeneration or both of the nitrogen pentoxide. The amount required may depend also on the frequency with which it is replaced. In general, it may be preferred to utilize a proportion of about 1½ grams of phosphorus pentoxide to about 1 gram of nitrogen pentoxide. This proportion is merely illustrative and may be varied over a wide range.

As a precautionary measure, the temperature at which the process is carried out is not too high. In general, a temperature range of the order of −20 to 30° C. is preferred, although this may vary depending upon the conditions of operation of the process. The extent of nitration does not appear to be primarily dependent on the temperature.

In general, it is preferred to carry out the process in the absence of substantial pressure. It is an advantage of the present process, however, that it may be carried out in an entirely enclosed system, thus avoiding the escape of undesirable vapors.

In order that the invention may be more clearly understood, reference may be had to the following specific examples of the carrying out of the nitration of various types of compositions in accordance with the present invention. For convenience, the amounts of ingredients have been given as those which may be easily utilized in the laboratory. The following examples are given merely by way of illustration and are not intended to be a limitation upon the scope of the invention:

Example I 5 grams of oven-dried powdered corn starch were added slowly, with agitation, to 88 cc. of a solution of $N_2O_5$ in $CHCl_3$, of an initial concentration of 35.5 grams $N_2O_5$/100 cc., circulated through 8 grams of $P_2O_5$. The initial temperature was 3° C., rising momentarily, to 30° and declining, under agitation and cooling to 15° after 15 minutes; total time 30 minutes. The nitrostarch was then removed by filtration, and stabilized by cold water washings with neutralizations with $NH_4OH$. Nitrogen content was 13.48%. The NS swelled in acetone rather than dissolved, exhibiting much greater viscosity than an NS of 13.14% N made from the same starch by mixed acids.

Example II 50 grams of oven-dried cotton linters were nitrated for 10 minutes at 19° C. in 4 liters of $CHCl_3$ of a continuously circulating solution of $N_2O_5$ in $CHCl_3$ of an initial concentration of 11.0 grams $N_2O_5$/100 cc., the nitrating solution being pumped through 66 grams of $P_2O_5$ in a separate container. The nitrocellulose was then drained, rinsed in $CHCl_3$, and fully stabilized within 9 hours boiling. Nitrogen content was 9.35%.

Example III 50 grams of oven-dried cotton linters were nitrated for 20 minutes at 17° C. in 4 liters of a continuously circulating solution of $N_2O_5$ in $CHCl_3$ of an initial concentration of 17.2 grams $N_2O_5$/100 cc., the nitrating solution being pumped through 66 grams of $P_2O_5$ in a separate container. The nitrocellulose was then drained, rinsed in $CHCl_3$, and fully stabilized within 9 hours boiling. Nitrogen content was 11.16%.

Example IV

Three separate nitrations of 50 grams each of oven-dried cotton linters were run for 30 minutes each at temperatures ranging from 19°–30° C. in 4 liters of continuously circulating solutions of $N_2O_5$ in $CHCl_3$ of initial concentrations ranging from 8–17.2 grams $N_2O_5$/100 cc., the nitrating solutions being pumped through containers holding 66 grams of $P_2O_5$. The nitrocelluloses were then drained, rinsed in $CHCl_3$, and fully stabilized within 9 hours boiling. The nitrogen contents ranged from 12.51–12.88%.

Example V 50 grams of oven-dried cotton linters were nitrated for 40 minutes at 17° C. in 4 liters of a continuously circulating solution of $N_2O_5$ in $CHCl_3$ of an initial concentration of 17.2 grams $N_2O_5$/100 cc., the nitrating solution being pumped through 66 grams of $P_2O_5$ in a separate container. The nitrocellulose was drained, rinsed with $CHCl_3$ and fully stabilized within 9 hours boiling. Nitrogen content was 12.92%.

Example VI

Seven separate nitrations of 50 grams each of oven-dried cotton linters were run for 60 minutes each at temperatures ranging from 16°–26° C. in 4 liters of continuously circulating solutions of $N_2O_5$ in $CHCl_3$ of initial concentrations ranging from 9–23 grams $N_2O_5$/100 cc., the nitrating solutions being pumped through containers holding 66 grams of $P_2O_5$. The nitrocelluloses were then drained, rinsed in $CHCl_3$, and fully stabilized by 9 hours boiling. The nitrogen contents ranged from 13.53 to 13.87%.

An analysis of the properties of several of these highly nitrated nitrocelluloses was as follows:

| Nitrogen content | Ether alcohol solubility | Acetone insolubility | Viscosity in std. acetone-alcohol |
|---|---|---|---|
| Per cent | Per cent | Per cent | Seconds |
| 13.85 | 6.9 | 1.0 | 2150 |
| 13.87 | 3.62 | 0.6 | ---- |

Example VII 50 grams of oven-dried cotton linters were nitrated for 120 minutes at 25° C. in 4 liters of a continuously circulating solution of $N_2O_5$ in $CHCl_3$ of an initial concentration of 10.7 grams $N_2O_5$/100 cc., the nitrating solution being pumped through 66 grams of $P_2O_5$ in a separate container. The nitrocellulose was then drained, repeatedly washed in $CHCl_3$, and fully stabilized by 3 hours boiling. The nitrogen content was 13.97%, the ether-alcohol solubility 1.2%, the acetone insolubility 1.0%. The nitrocellulose was then submitted to the "240 Hour Stability Test" which showed 0.69% of the total available nitrogen converted to nitric acid. This shows the extreme stability of the product.

Example VIII

Cellulose in an amount of 2 grams was nitrated with a chloroform solution containing 10.7 grams of $N_2O_5$ per 100 cc. of solution. The nitration was carried out for 1 minute at 27° C. The product was found to contain 5.3% nitrogen. This example is included primarily to show the unique relation between nitrogen content and time of nitration.

In Examples 2–8, inclusive, if the per cent nitrogen content be plotted against time of nitration, on logarithmic paper, a virtually linear relation will be observed between nitration times of 1–40 minutes, and all points lie on or near the curve, indicating that the reaction rate is virtually independent of concentration of $N_2O_5$, between approximately 8–24 grams $N_2O_5$/100 cc. This unique result makes possible the application of a truly continuous process of nitration in which the degree of nitration is primarily dependent upon time alone, within a wide range of concentration of $N_2O_5$.

Example IX 5 grams of pentaerythritol were added slowly with vigorous agitation to 82 cc. of a solution of $N_2O_5$ in $CHCl_3$ of a concentration of 30.5 grams $N_2O_5$/100 cc. and nitrated at 5°–18° C. for 30 minutes, the nitrating solution being circulated through 15 grams of $P_2O_5$. The PETN was recovered, washed, and stabilized by digestion in weak alkaline solution. Yield 95%.

Example X 6.5 grams of toluene were added dropwise while stirring, to 250 cc. of a solution of $N_2O_5$ in $CHCl_3$, of an initial concentration of 23.5 grams $N_2O_5$/100 cc., in the presence of 15 grams of $P_2O_5$. The addition period was 10 minutes and the temperature was maintained at −8° C. to +3° C. Agitation was continued for 5 minutes more. The mix was then filtered through glass wool and repeatedly washed with cold $CHCl_3$ and the filter cake pressed. The $CHCl_3$ solution was then evaporated under reduced pressure to remove residual $N_2O_5$, after which the $CHCl_3$ was distilled off on a water bath. The nitrated product was washed in hot water and recrystallized twice from alcohol. Analyses and explosion tests indicated that its composition was approximately 57% DNT, 43% TNT.

Example XI 2.00 grams of dimethyloxamide were added to 100 cc. of a solution of $N_2O_5$ in $CCl_4$, of an initial concentration of 10.3 grams $N_2O_5$/100 cc. in the presence of 3 grams of $P_2O_5$. The temperature rose rapidly from 15°–30° C. and was maintained at approximately 20° for 45 minutes. The clear solution was then filtered from the $P_2O_5$ and phosphoric acid which was washed and pressed in $CCl_4$. The residual $N_2O_5$ was recovered by vacuum distillation and the $CCl_4$ distilled off by boiling. The residue of crude dry dinitrodimethyloxamide was 3.5 grams or approximately 100% of theory.

The above specific examples which are given merely by way of illustration, have been selected to demonstrate the effective nitration of a wide variety of important types of starting materials. It will be noted that these form extremely important classes of nitroproducts. However, as discussed above, the invention is not to be limited to the treatment of the specific materials mentioned and, if desired, less highly nitrated products, for example, suitable for use in lacquers and other uses, may be prepared in accordance with the invention.

In view of the foregoing disclosure, many variations in the carrying out of the present invention may be suggested to one skilled in the art, and all such variations are intended to be included within the scope of the invention.

I claim:

1. A process of nitrating a material capable of being nitrated by replacement of hydrogen therein with a nitro group, which comprises treating the material with nitrogen pentoxide dissolved in a non-aqueous solvent in the proportion of about 5 to 50 grams of nitrogen pentoxide to 100 cc. of solution, maintaining a temperature of about 0° C. to 30° C. during the nitration, and contemporaneously bringing the solution into contact with phosphorus pentoxide to regenerate nitrogen pentoxide.

2. A process of nitrating a material capable of being nitrated by replacement of hydrogen therein with a nitro group, which comprises reacting the material with nitrogen pentoxide dissolved in a non-aqueous solvent, maintaining a temperature of less than about 30° C. during the nitration and contemporaneously eliminating nitric acid from the solution with phosphorus pentoxide.

3. A process of nitrating a material capable of being nitrated by replacement of hydrogen therein with a nitro group, which comprises treating the material with nitrogen pentoxide dissolved in a non-aqueous solvent, said treatment being carried out in the presence of phosphorus pentoxide.

4. A process of nitrating a material capable of being nitrated by replacement of hydrogen therein with a nitro group, which comprises forming a solution of nitrogen pentoxide in a non-aqueous solvent, and bringing said solution into contact with the material and with phosphorus pentoxide.

5. A continuous process of nitrating a material capable of being nitrated by replacement of hydrogen therein with a nitro group, which comprises forming a solution of nitrogen pentoxide in a non-aqueous solvent, and continuously circulating and recycling said solution successively through the material and phosphorus pentoxide.

6. A continuous process of nitrating a material capable of being nitrated by replacement of hydrogen therein with a nitro group, which comprises continuously circulating and recycling a solution of nitrogen pentoxide dissolved in a non-aqueous solvent through a plurality of vessels, at least one of said vessels containing the material, and at least one of said vessels containing phosphorus pentoxide.

7. A continuous process of nitrating a material capable of being nitrated by replacement of hydrogen therein with a nitro group, which comprises treating the material with a solution of nitrogen pentoxide in a non-aqueous solvent, said material and said solution being passed counter-currently through a nitrating zone in the presence of phosphorus pentoxide.

8. A process of nitrating a material capable of being nitrated by replacement of hydrogen therein with a nitro group, which comprises counter-currently treating the material with a flow of a solution of nitrogen pentoxide dissolved in a non-aqueous solvent, and treating said solution with phosphorus pentoxide to eliminate nitric acid.

9. A process of nitrating a material capable of being nitrated by replacement of hydrogen therein with a nitro group, which comprises agitating a mixture of the material, phosphorus pentoxide, and a solution of nitrogen pentoxide in chloroform.

10. A process of nitrating a material capable of being nitrated by replacement of hydrogen therein with a nitro group, which comprises treating the material with a solution of nitrogen pentoxide in chloroform and contemporaneously eliminating nitric acid from the solution.

11. A substantially anhydrous process of nitrating carbohydrates whereby hydrolytic degeneration of the carbohydrates during nitration is substantially avoided which comprises treating the carbohydrate to be nitrated with a solution of nitrogen pentoxide dissolved in a non-aqueous solvent, and during said treatment of the carbohydrate, eliminating nitric acid from the solution with phosphorus pentoxide.

12. A process of nitrating cellulose which comprises contacting a solution of nitrogen pentoxide in a non-aqueous solvent with cellulose and with phosphorus pentoxide.

13. A substantially anhydrous process of preparing nitrocellulose of improved physical properties which comprises treating cellulose with a solution of nitrogen pentoxide in chloroform, and eliminating the nitric acid formed upon nitration by contacting the solution with phosphorus pentoxide.

14. A process of preparing nitrocellulose which comprises circulating a solution comprising nitrogen pentoxide in a non-aqueous solvent in contact with the cellulose and then in contact with phosphorus pentoxide.

15. A process of nitrating starch which comprises contacting a solution of nitrogen pentoxide in a non-aqueous solvent with starch and with phosphorus pentoxide.

16. A process of nitrating pentaerythritol which comprises contacting a solution of nitrogen pentoxide in a non-aqueous solvent with pentaerythritol and with phosphorus pentoxide.

GEORGE V. CAESAR.